J. M. WATSON.
MACHINE FOR CUTTING BOOT AND SHOE SHANKS FROM LEATHER
No. 183,607. Patented Oct. 24, 1876.
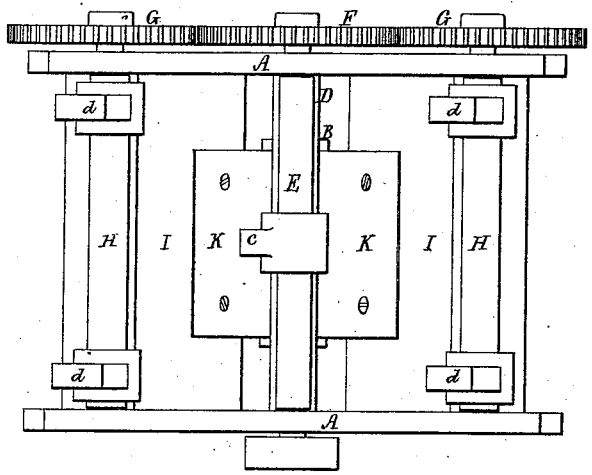
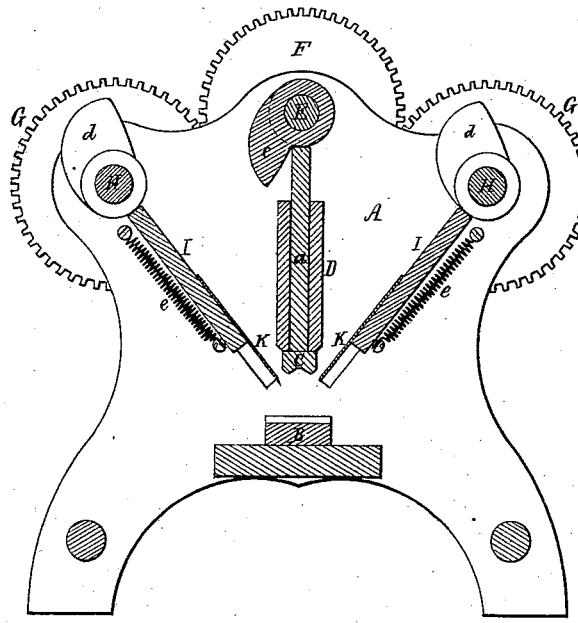
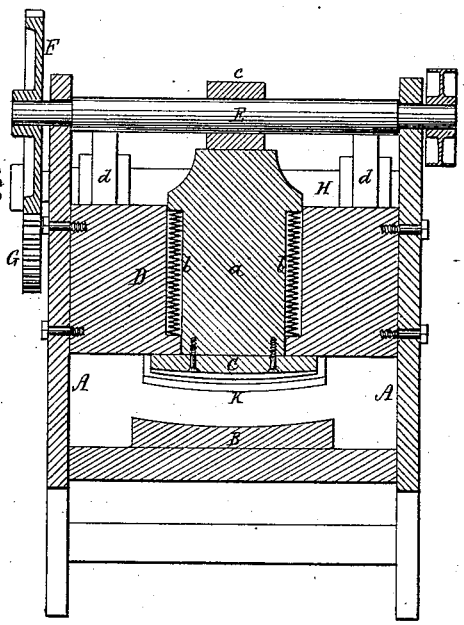
Witnesses.
S. N. Piper
L. A. Möller
Jeremiah M. Watson
by his attorney.
R. H. Eddy

UNITED STATES PATENT OFFICE.

JEREMIAH M. WATSON, OF SHARON, MASSACHUSETTS.

IMPROVEMENT IN MACHINES FOR CUTTING BOOT AND SHOE SHANKS FROM LEATHER.

Specification forming part of Letters Patent No. 183,607, dated October 24, 1876; application filed August 25, 1876.

*To all whom it may concern:*

Be it known that I, JEREMIAH M. WATSON, of Sharon, of the county of Norfolk and State of Massachusetts, have invented a new and useful Machine for Cutting Boot or Shoe Shank Blanks from Leather or other proper sheet material and shaping or molding them; and I do hereby declare the same to be fully described in the following specification, and represented in the accompanying drawings, of which—

Figure 1 is a top view; Fig. 2, a longitudinal section, and Fig. 3 a transverse section, of it.

In this machine there is employed, with a molding or shaping bed and platen, or molder, to operate with the said bed, two reciprocating knives, which are inclined to the bed. Each of the said knives has its path of movement crossing that of the other, whereby they are caused to cut from the sheet a shank-stiffener beveled in opposite directions on its opposite edges, such stiffener being afterward, and before being expelled from the machine, submitted to the action of the shaping or molding dies or bed and platen, which are to be so constructed as to compress it, and properly round or shape it in other respects, so as to finish it to the form for use.

In the drawings, A denotes the frame of the machine, it being furnished with a stationary molding die or bed, B. Over the said bed is a movable platen or molding-die, C, whose shank *a* is supported within a cross-bar, D, and provided with one or more springs, *b*, for effecting its upward movement within such bar out of the way of either of the cutters. A transverse shaft, E, arranged in the frame in manner as shown, carries a cam or wiper, *c*, to effect the downward movement of the molding-die shank. This shaft has fixed upon it, at or near one end of it, a gear, F, arranged between and engaged with two other gears, G G, which are fixed on two shafts, H H, disposed as represented. Each shaft H has upon it two cams, *d d*, against which the upper edge of one of a pair of inclined knife slides or carriers, I I, bears, each of such slides being furnished with one or more springs, *e*, for moving it upward. Each slide should be arranged at its ends in suitable guides to enable it to move rectilinearly up or down, there being fixed to each slide one of a pair of knives, K K, which are to be arranged in manner as represented.

On laying a strip of leather or leather-board upon the bed-die, and revolving the driving-shaft, the knives will successively be depressed and forced through the sheet, each rising upward out of the way of the other prior to its descent. They will cut from the sheet or strip a blank beveled in opposite directions on its two opposite edges. On such blank having been so made, the movable molding die or platen will be forced down upon it, so as to press it firmly to the molding-bed, and with such impart to it its necessary finish.

I claim as my invention—

In a machine for the production and finishing of shank-stiffeners, the combination of the reciprocating die C with the bed or fellow die B, and the two inclined and intermittently-reciprocating knives K K, all being arranged substantially as described, and provided with mechanism for operating the movable parts thereof, essentially as set forth.

JEREMIAH M. WATSON.

Witnesses:
R. H. EDDY,
J. R. SNOW.